United States Patent
Bidner et al.

(10) Patent No.: US 8,352,159 B2
(45) Date of Patent: *Jan. 8, 2013

(54) FUEL BASED ENGINE OPERATION CONTROL

(75) Inventors: David Karl Bidner, Livonia, MI (US); Thomas G. Leone, Ypsilanti, MI (US); Joseph Norman Ulrey, Dearborn, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,924

(22) Filed: May 29, 2012

(65) Prior Publication Data

US 2012/0239277 A1 Sep. 20, 2012

Related U.S. Application Data

(63) Continuation of application No. 13/271,551, filed on Oct. 12, 2011, now Pat. No. 8,195,377, which is a continuation of application No. 12/173,644, filed on Jul. 15, 2008, now Pat. No. 8,041,497.

(51) Int. Cl.
- *B60T 7/12* (2006.01)
- *G05D 1/00* (2006.01)
- *G06F 7/00* (2006.01)
- *G06F 17/00* (2006.01)

(52) U.S. Cl. .................. 701/103; 701/108; 123/568.14; 123/316; 123/575

(58) Field of Classification Search .................. 701/103, 701/104, 108; 123/304, 316, 575, 568.14, 123/568.21, 90.15
See application file for complete search history.

(56) References Cited

U.S. PATENT DOCUMENTS

| | | | | |
|---|---|---|---|---|
| 5,188,087 A * | 2/1993 | Saito | ........................ | 123/568.21 |
| 5,515,833 A | 5/1996 | Cullen et al. | | |
| 5,520,161 A * | 5/1996 | Klopp | ........................... | 123/676 |
| 5,957,094 A | 9/1999 | Krausman et al. | | |
| 6,062,026 A | 5/2000 | Woollenweber et al. | | |
| 7,287,492 B2 * | 10/2007 | Leone et al. | .................. | 123/1 A |
| 7,487,766 B2 * | 2/2009 | Alger et al. | ............. | 123/568.14 |
| 2003/0106542 A1 * | 6/2003 | Aoyama et al. | .......... | 123/568.14 |
| 2004/0230364 A1 | 11/2004 | Uchida et al. | | |
| 2005/0193995 A1 * | 9/2005 | Nomura | ................... | 123/568.14 |
| 2006/0102136 A1 | 5/2006 | Bromberg et al. | | |
| 2008/0035106 A1 * | 2/2008 | Stein | ............................. | 123/304 |
| 2008/0092834 A1 * | 4/2008 | Stein et al. | ................. | 123/90.15 |
| 2008/0127933 A1 * | 6/2008 | Blumberg et al. | ............ | 123/304 |

FOREIGN PATENT DOCUMENTS

JP 2001271665 A 10/2001

\* cited by examiner

*Primary Examiner* — Willis R Wolfe, Jr.
*Assistant Examiner* — Anthony L Bacon
(74) *Attorney, Agent, or Firm* — Julia Voutyras; Alleman Hall McCoy Russell & Tuttle LLP

(57) ABSTRACT

Methods are provided for operating an engine with a variable fuel blend in a cylinder, where the variable fuel blend varies a peak achievable engine torque for a given operating condition. One example method comprises selectively operating an engine actuator that affects engine torque and engine fuel economy at the given operating condition, and extending operation of the actuator to higher engine torques as a peak engine torque for the given operating condition increases.

14 Claims, 4 Drawing Sheets

FUEL BASED ENGINE OPERATION CONTROL

CROSS REFERENCE TO RELATED APPLICATIONS

The present application is a continuation of U.S. patent application Ser. No. 13/271,551, filed Oct. 12, 2011, which is a continuation of U.S. patent application Ser. No. 12/173,644 filed Jul. 15, 2008, the entire contents of each of which are incorporated herein by reference for all purposes.

FIELD

The present application relates to a method for controlling engine operating parameters in a vehicle capable of operating on a plurality of fuels.

BACKGROUND AND SUMMARY

Internal combustion engines may utilize an exhaust gas recirculation (EGR) system to re-circulate a controlled portion of exhaust gas generated by the engine into an intake manifold of the engine. Similarly, variable valve mechanisms in internal combustion engines may also be used to enhance engine performance by improving intake efficiency and decreasing exhaust emissions. Control systems have been provided which vary the EGR rate and/or valve timing according to one or more sensed conditions, such as engine temperature, air charge and engine speed, to thereby improve engine drivability and emissions.

One example approach for EGR control is shown by Cullen et al. in U.S. Pat. No. 5,515,833. In this example, the EGR rate in an engine is adjusted based on an engine speed, an air charge value and an ambient barometric pressure. Specifically, a base EGR rate is computed as a function of engine speed and prevalent air charge. Next, a maximum EGR rate is computed as a function of the ratio of the prevalent air charge to the peak air charge, further compensating for a given barometric pressure. The EGR rate is then gradually blended from an initial value of zero to the maximal EGR rate level over a predetermined period of time.

However, the inventors herein have recognized several issues with such an approach. As one example, a change in peak air charge may not necessarily correlate with changes in peak engine torque output. In other words, in Cullen et al., it was possible to compensate for the changes in peak engine output due to barometric pressure changes using the peak air charge. However, in directly injected flexible fueled vehicles capable of operating on a variety of fuels and fuel combinations, changes in peak air charge may not correlate with changes in peak torque. Specifically, peak torque of the engine may change at a given altitude due to changes in fuel composition, thus changing the charge cooling and/or octane effectiveness of the injected fuel. As such, the system may provide too much, or too little EGR for various operating conditions. This can result in degraded fuel economy when too little EGR is provided, and degraded drivability when too much EGR is provided.

Thus, in one example, the above issues may be addressed by a method of operating an engine in a vehicle, the method comprising: operating the engine with a variable fuel blend in a cylinder, where the variable fuel blend varies a peak achievable engine torque for a given operating condition and selectively operating an engine actuator that affects engine torque and engine fuel economy at the given operating condition. The method further comprises extending operation of the actuator to higher engine torques as a peak engine torque for the given operating condition increases.

In one example, the engine actuator operates an EGR schedule such that an EGR amount is gradually phased in as the torque approaches a predetermined threshold, such as a mid or low torque, and then the EGR amount is gradually phased out as the torque approaches the peak achievable torque for the given fuel blend. As such, a peak achievable torque may change responsive to changes in fuel composition. Accordingly, the engine actuator may phase in and phase out the EGR amount differently over the dynamically changing achievable torque range, responsive to the current fuel composition.

In another example, the engine actuator operates a late intake valve closing (LIVC) schedule such that an LIVC amount is gradually phased out as the torque approaches the peak achievable torque for the given fuel blend. As the fuel composition varies (e.g., due to refueling events), and consequently the operating torque range varies, the engine actuator may phase out the LIVC amount differently depending on the torque range available.

In this way, by adjusting an EGR and/or an LIVC schedule responsive to a change in the peak achievable torque, reflective of a change in the fuel composition, the benefits of EGR and/or LIVC may be utilized, as needed, over an extended range of operating torques while addressing fuel efficiency and engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for controlling engine operating parameters of an engine in a vehicle operating on a plurality of fuel possibilities, such as a directly injected flex fuel vehicle. Specifically, for a given operating condition (e.g., engine speed), an EGR amount and/or a late intake valve closing (LIVC) amount may be adjusted differently for differing fuel compositions, and hence differing effective charge cooling or octane ratings of fuel in the fuel tank. Herein, the EGR and/or LIVC schedule may be adjusted to correlate with a dynamically changing maximum achievable peak torque responsive to changes in fuel composition, such as due to refueling events.

Figure 2:
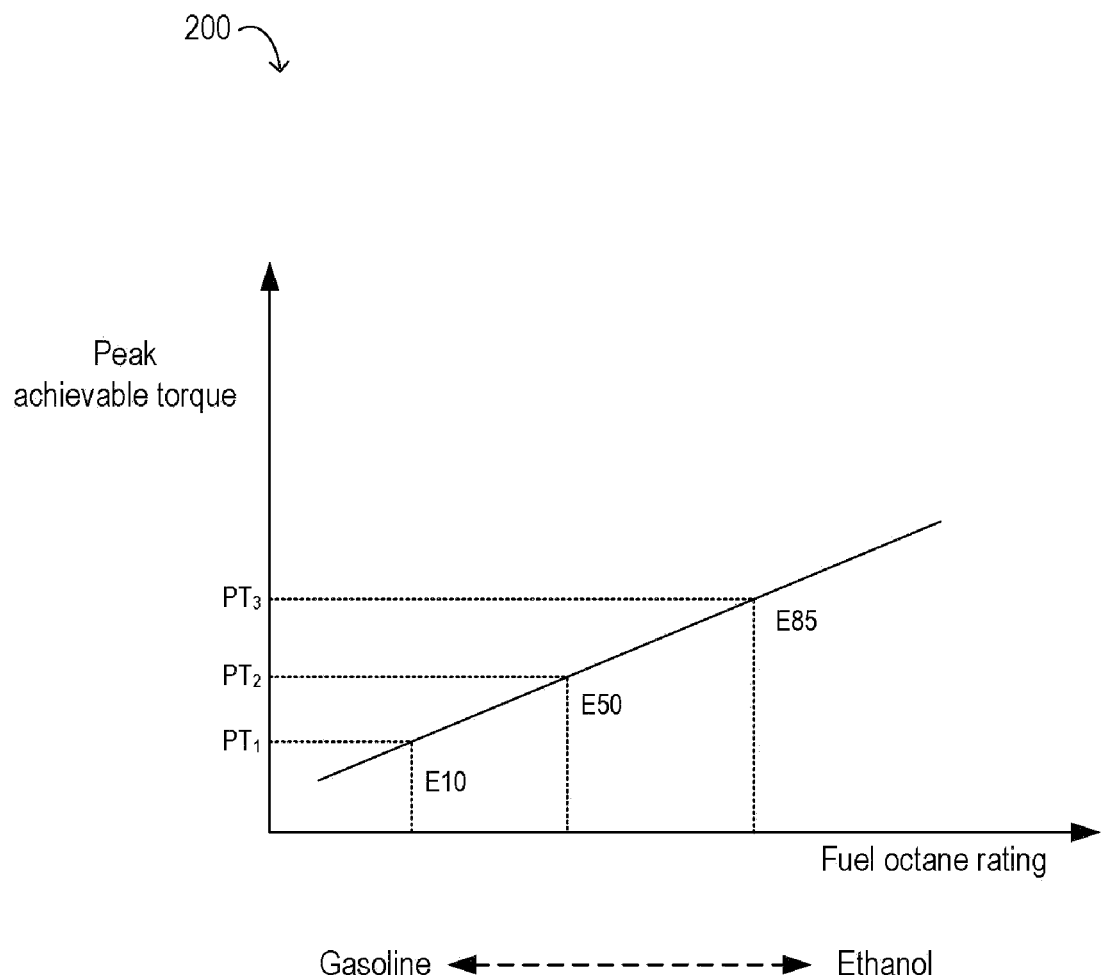
FIG. 2 shows a graph illustrating variations in peak achievable torque for a given operating condition responsive to a variation in the fuel composition.
Figure 3:
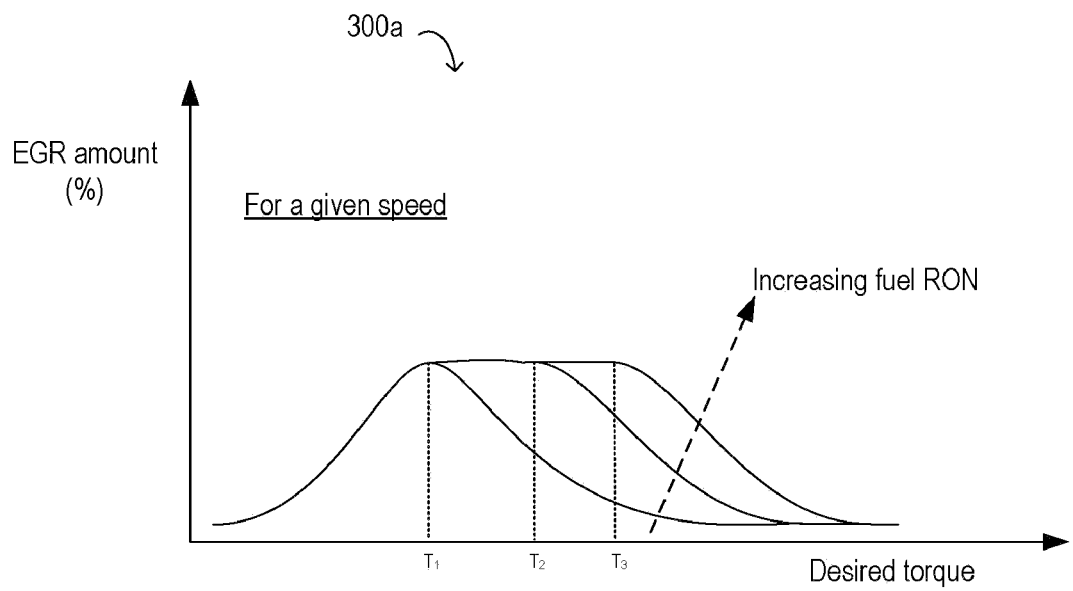
FIG. 3 shows graphs illustrating variations in an EGR schedule and an LIVC schedule for a given speed responsive to a variation in fuel composition.
Figure 3:
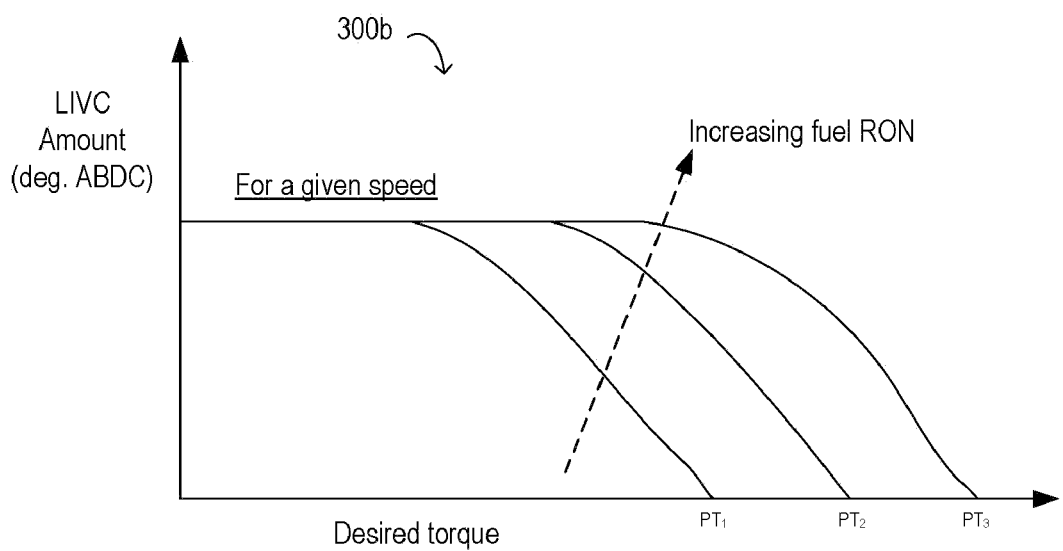
Figure 4:
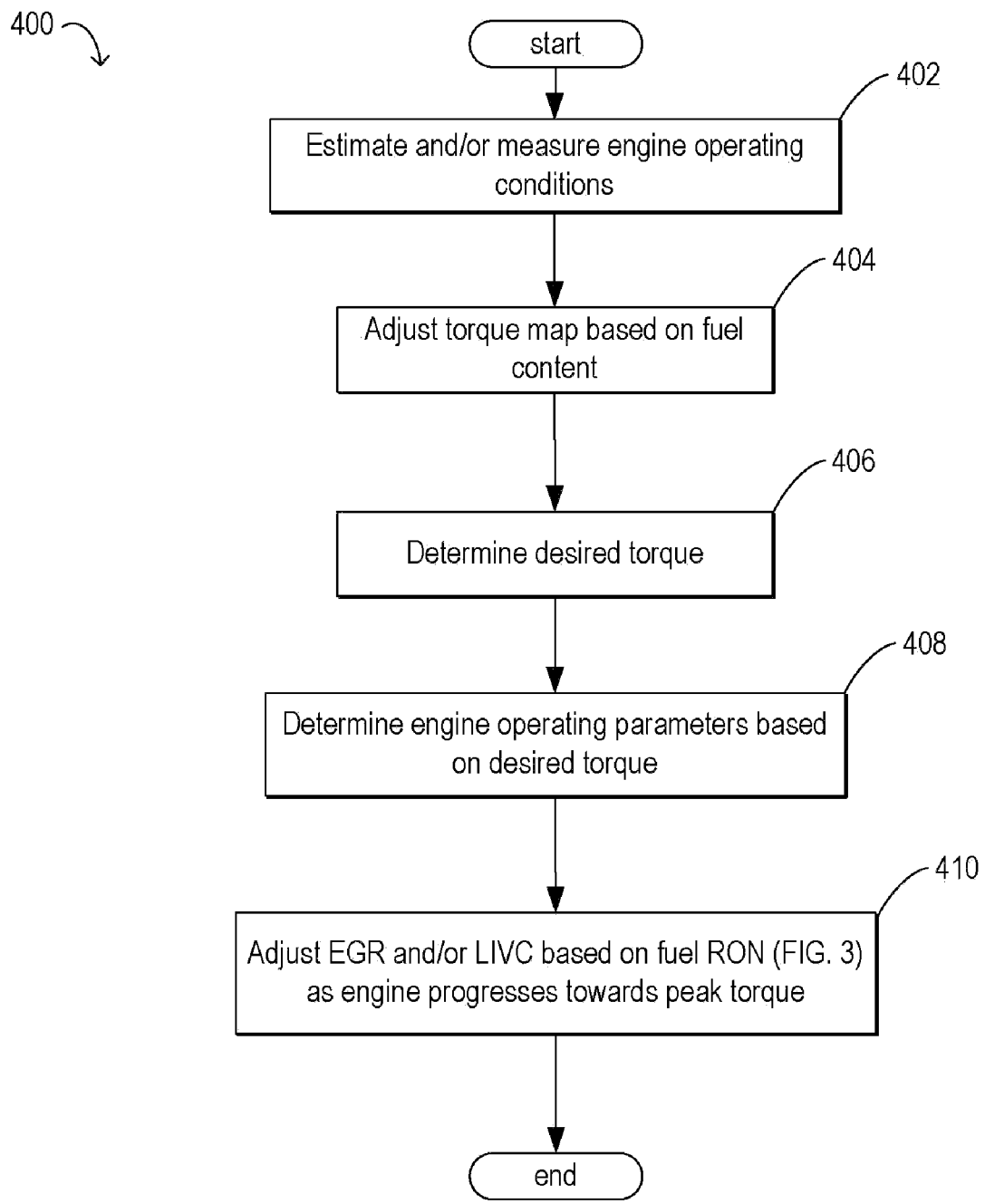
FIG. 4 shows a high level flow chart for engine operation control according to the present disclosure.

As illustrated in FIG. 2, the peak achievable torque increases as an alcohol content (and consequently an octane rating) of the fuel blend directly injected into the cylinder increases. In part, this is due to the advantageous charge cooling effects and increased octane of the alcohol fuel. Thus, for a given fuel composition, a peak achievable torque and a torque map may be determined. Accordingly, as illustrated in FIG. 3, for the given fuel composition, the EGR schedule may be adjusted such that the amount of EGR is gradually phased in towards a maximum threshold, and then gradually phased out, as peak torque is reached. As the octane rating of the fuel injected into the cylinder increases, the EGR schedule may be extended over a larger torque range. The EGR schedule may be adjusted by controller 12 to provide more EGR at selected torque values and to start phasing out EGR at a higher torques by performing an EGR adjustment routine (FIG. 4). Further, EGR schedule may be maintained at mid and lower torque levels even as the peak torque for a given conditions varies. Thus, by selectively adjusting the EGR schedule responsive to the fuel composition, EGR may be advantageously used at low to mid-peak torque, but reduced as peak torque approaches, even as the peak torque changes. In this way, the adjusted operation allows the benefits of EGR to be extended over a larger range of torque values, when available. By minimizing EGR by the time a driver operates at full throttle (peak torque conditions), vehicle drivability and quality of emissions may be improved.

As also illustrated in FIGS. 3-4, a similar approach may be applied additionally, or optionally, to an LIVC amount. Specifically, an LIVC schedule may be adjusted such that the LIVC may be phased out as a peak torque condition is reached. By adjusting the schedule of LIVC to extend to higher torques and to gradually phase out as a higher peak torque is reached, responsive to an increase in the alcohol content of the fuel received in the engine, the benefits of LIVC may be extended over a larger range of torque values. Consequently, reduced emissions and improved fuel efficiency may be achieved.

Figure 1:
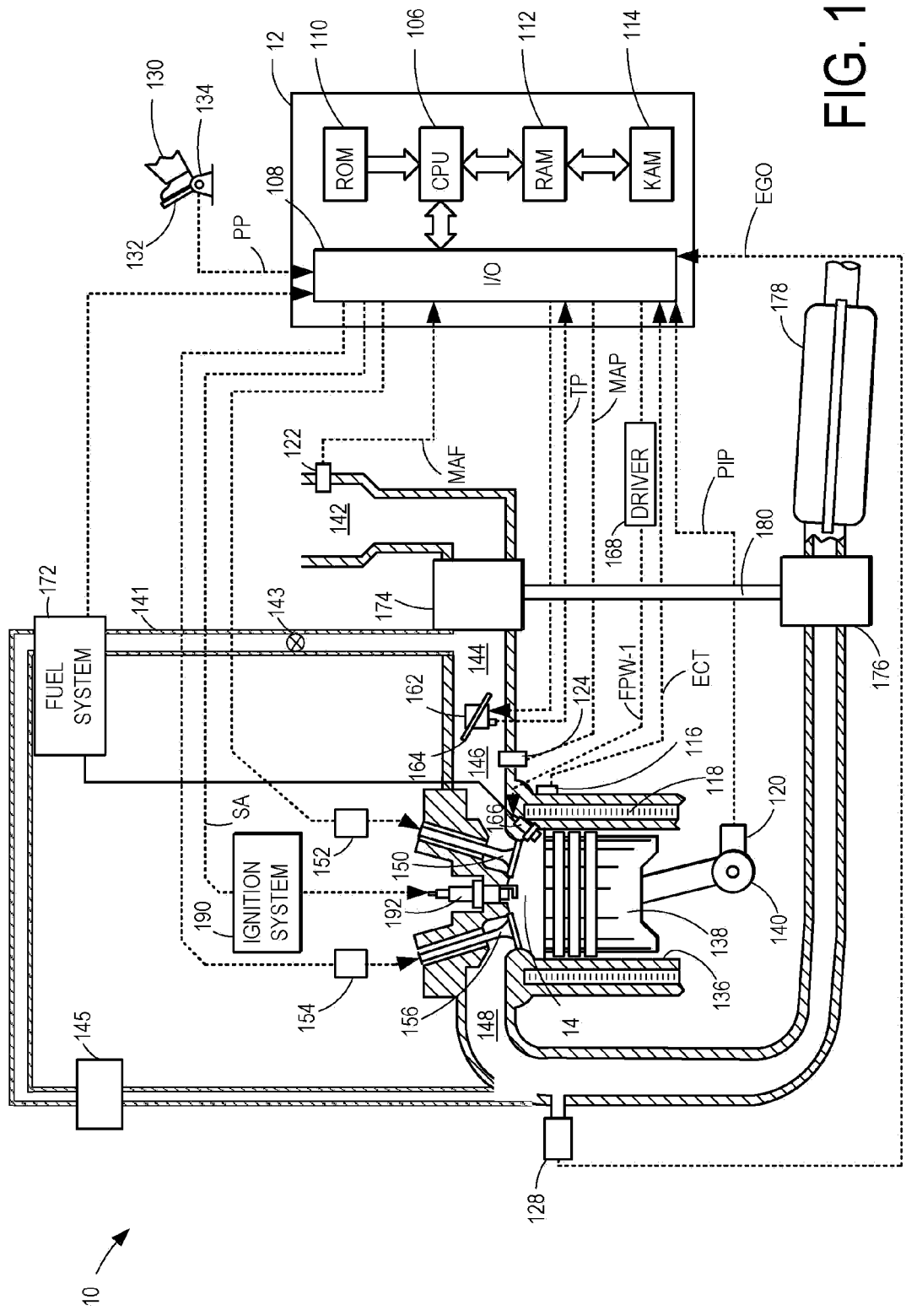
FIG. 1 shows an example embodiment of an engine operating on more than one type of fuel.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In one embodiment, the inlet valve actuator may be controlled by controller 12 to perform a late intake valve closure (LIVC). Herein, by delaying the closing of the intake valve, a part of the air charge that is not needed for the desired output may be expelled from the cylinder prior to combustion. As such, volumetric efficiency may be improved using LIVC at low to medium speeds. At high speeds, however, LIVC may not be utilized.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 172 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternate embodiment, injector 166 may be a port injector providing fuel into the intake port upstream of cylinder 14. It will also be appreciated that cylinder 14 may receive fuel from a plurality of injectors, such as a plurality of port injectors, a plurality of direct injectors, or a combination thereof.

Fuel tank in fuel system 172 may hold fuels with different fuel qualities, such as different fuel compositions. These differences may include different alcohol content, different octane, different heats of vaporization, different fuel blends, and/or combinations thereof etc. One example of fuels with different heats of vaporization could include gasoline as a first substance with a lower heat of vaporization and ethanol as a second substance with a greater heat of vaporization. The engine may optionally use an alcohol containing fuel blend such as E85 (which is approximately 85% ethanol and 15% gasoline) or M85 (which is approximately 85% methanol and 15% gasoline). Other feasible substances include water, a mixture of alcohol and water, a mixture of alcohols etc. Moreover, fuel characteristics of the fuel tank may vary frequently. In one example, a driver may refill the fuel tank with E85 one day, and E10 the next, and E50 the next. As such, based on the level and composition of the fuel remaining in the tank at the time of refilling, the fuel tank composition may change dynamically.

The day to day variations in tank refilling can thus result in frequently varying fuel composition of the fuel in fuel system 172, thereby affecting the fuel composition and/or fuel quality delivered by injector 166. The different fuel compositions injected by injector 166 may hereon be referred to as a fuel type. In one example, the different fuel compositions may be qualitatively described by their research octane number (RON) rating.

It will be appreciated that while in one embodiment, the engine may be operated by injecting the variable fuel blend via a direct injector, in alternate embodiments, the engine may be operated by using two injectors and varying a relative amount of injection from each injector, or by injecting different fuels through the two injectors. It will be further appreciated that when operating the engine with a boost from a boosting device, the boosting limit may be increased as an alcohol content of the variable fuel blend is increased.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Engine 10 may further include a fuel vapor purging system for storing and purging fuel vapors to the intake manifold of the engine via vacuum generated in the intake manifold. Fuel vapors may be stored and purged during some conditions to one or more cylinders of the engine where they may be combusted.

Further, in the disclosed embodiments, an exhaust gas recirculation (EGR) system may route a desired portion of exhaust gas from exhaust passage 148 to intake passage 144 via EGR passage 141. The amount of EGR provided to intake passage 148 may be varied by controller 12 via EGR valve 143. Further, an EGR sensor 145 may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

Controller 12 may be configured to determine a peak achievable torque responsive to the fuel composition of the engine operating with a variable fuel blend. In one example, the fuel blend varies after a refueling event where a fuel of a different alcohol blend than that in the fuel tank is provided.

A map, such as Map 200 depicted in FIG. 2, may be used to determine how in an engine operating with a variable fuel blend in the cylinder, the variable fuel blend varies the peak achievable torque for a given operating condition. The peak achievable torque may reflect the peak torque achievable at the given operating condition, with the given fuel composition, with all actuators operating at peak torque conditions. In one example, peak torque conditions may include zero EGR and zero LIVC (e.g., closing at or near BDC). As such, the peak achievable torque may increase as the alcohol content, and hence octane rating and heat of vaporization, of the fuel increases. A lookup table may be generated based on Map 200. The example map illustrated in FIG. 2 shows variations in peak achievable torque values for three sample fuel blends of differing ethanol content and hence octane rating. As a fuel blend ethanol content increases (E10 has 10% ethanol compared to 50% for E50 and 85% for E85), the fuel octane rating and the maximum achievable peak torque (PT) increases from $PT_1$ to $PT_2$ to $PT_3$. The higher alcohol content provides significant knock suppression due to the substantial air charge cooling effects of a fuel with a high heat of vaporization. The alcohol induced octane rating enhancement of the fuel blend allows a pressure boosted engine operation to take place at higher levels of turbocharging than would otherwise be possible with a gasoline fuel only. Through the knock suppression mechanism of the alcohol fuel, the turbocharged engine achieves higher compression ratios. Consequently, when operating the engine with a boost from a boosting device, the boosting limit may be increased as an alcohol content of the variable fuel blend is increased. Thus the engine operating with more alcohol fuel may produce more torque in a lower rpm range and provide a more responsive engine performance. As such, a torque map reflecting a range of torques obtainable at the given fuel composition may be calculated. It thus follows that for a fuel of higher octane rating (e.g. E85), the torque map may cover a wider range of values than for a fuel of lower octane rating (e.g. E10). Thus, the variable fuel blend varies a peak achievable engine torque for a given operating condition to thereby provide a variable sized available engine torque.

FIG. 3 comprising maps 300a and 300b depicts variations in EGR schedules and LIVC schedules respectively, for a given operating condition, responsive to changes in fuel composition. As depicted herein, the given operating condition is engine speed. The fuel composition in the fuel tank of engine 10 may change dynamically as different fuels are consumed and replenished at different rates. Accordingly, the composition and properties of a fuel blend finally received for combustion in the engine may change dramatically from day to day. Correspondingly, as depicted in FIG. 2, a peak achievable torque and a torque map indicative of the range of torques achievable may change dynamically. For a given speed, and at any given fuel composition, it may be desirable to adjust an EGR amount such that a maximal EGR is gradually phased in and used advantageously at a predetermined torque threshold, such as a mid torque. It may be desirable to further adjust the EGR amount such that the EGR is gradually phased out (or phased down to a predetermined minimum threshold) as a peak torque is reached. In doing so, the advantages of EGR may be used over an extended torque range (when such an extended range of torques is available) without compromising engine performance and emissions. Since, a peak achievable torque changes with a changing fuel composition, operation of an EGR actuator may be accordingly varied by adjusting a range of engine torques at which EGR is provided at the given operating condition. As such, the range of operation may be extended to higher torques as the peak torque increases.

Map 300a illustrates selective operation of an engine EGR actuator and a gradual phasing in of a maximal EGR amount as a mid-peak torque is approached. The EGR schedule is adjusted such that EGR may be provided for a larger torque range as the peak achievable torque increases responsive to an increasing fuel octane rating (herein represented by an increasing RON number). Consequently, as the operating torque range increases, a schedule of phasing out EGR may be adjusted such that the phasing out EGR is started at a higher torque (represented herein by torques $T_1$, $T_2$, and $T_3$) as the fuel octane rating, and hence peak torque, increases. The schedule of an upper threshold of desired EGR amount may also be adjusted corresponding to an increasing maximum achievable mid torque as the octane rating for a fuel increases. As further depicted in map 300a, for a given speed, as the RON number of a fuel increases, and the peak achievable torque increases, operation of the EGR actuator is extended to higher engine torques to cover a larger torque range.

It will be appreciated that in one example, the EGR amount may be an internal EGR amount. Herein, as further elaborated in FIG. 4, by adjusting a variable valve timing or lift actuator, an amount of internal EGR provided may be adjusted at the given operating condition. As such, the timing may be adjusted to allow the amount of internal EGR to increase as a peak torque increases.

Analogously, map 300b depicts how for a given speed, an engine LIVC actuator may be selectively operated to adjust an LIVC schedule such that an LIVC amount is gradually phased out from a maximal value at low torque to a minimal value (for example no LIVC) at peak torque. As the fuel octane rating changes towards a higher value and a peak achievable torque increases (represented by peak torques 1, 2, and 3, $PT_{1-3}$), operation of an LIVC actuator may be varied by adjusting a range of engine torques at which LIVC is provided at the given operating condition, and by extending the range to higher torques as the peak torque increases. In this way, an LIVC actuator may be operated to phase in LIVC as a torque threshold is reached and phase out LIVC as the peak achievable torque is reached, such that the phasing out of LIVC is started at a higher torque as the peak torque increases. Thus, by phasing out EGR and/or LIVC as a peak engine torque approaches, when peak torque is requested, the maximal benefits of EGR and/or LIVC may be taken advantage of without compromising engine performance, volumetric efficiency, and effects on emission levels.

It will be appreciated that maps 300a and 300b depict EGR and LIVC phasing trends for a given speed. As such a similar set of maps may be computed for all possible speeds, or alternate operating conditions. Further, the results of such maps may be integrated into a look-up table.

In this way, by selectively operating an engine actuator that affects engine torque and engine fuel economy at the given operating condition, and further extending operation of the actuator to higher engine torques as the peak engine torque for the given operating condition increases, engine drivability and performance at higher torques can be improved. By phasing the engine actuator in and out of operation differently over the variable peak achievable torque range, responsive to the current fuel blend, EGR and/or LIVC may be used advantageously at torque ranges where they provide increased driving benefits, but not at peak torques where they may not be desired. It will be appreciated than while in some embodiments, the engine actuator affects an EGR and/or an LIVC amount, in alternate embodiments, other engine operating parameters, such as spark timing, may be affected. Finally, it should be noted that the above approach also overcomes issues associated with relying on a percent of peak torque approach. Specifically, according to the above approach, away from the peak torque, the EGR may be properly scheduled based on the torque level, and thus any potential skewing effects are reduced.

Controller 12 may be configured to adjust the EGR and/or LIVC schedules by performing an adjustment routine 400, as shown in FIG. 4, based on phasing trends computed in maps 300a and b. The phasing trends allow maximal EGR and/or LIVC benefits to be achieved at mid-peak torques, when they are most required, while allowing EGR and/or LIVC to be reduced to a minimal level at peak torque, when they may have otherwise affected engine performance adversely. By dynamically adjusting the phasing trends responsive to dynamically changing fuel compositions, a flex fueled vehicle may achieve improved engine performance and reduced emissions, in particular at high operating torques.

At 402, the engine operating conditions are estimated and/or measured. These include, but are not limited to, engine temperature, engine coolant temperature, engine speed, manifold pressure, air-fuel ratio, equivalence ratio, cylinder air amount, spark timing, barometric pressure, etc. Additionally, the fuel content and composition available for injection may be estimated and/or measured.

At 404, based on the fuel content and composition, a peak achievable torque and a torque map may be computed, using map 200 for example. In one example, a prevalent torque map may be based on the fuel content and composition estimated on a previous iteration of routine 400. At the time, the fuel tank may have been filled with gasoline only. As such, for a fuel of lower octane rating such as gasoline, a lower peak achievable torque and a narrower torque map may have been computed. Prior to the next iteration, the driver may have refilled the tank with an ethanol blend such as E85. Accordingly, during the next iteration, a fuel of higher octane rating may be estimated and a higher peak achievable torque and a broader torque map may be computed.

At 406, the desired engine output torque is determined. In one example, the desired torque may be estimated from a pedal position signal. At 408, based on the estimated engine operating conditions, the desired torque, and further based on the adjusted torque map indicating the range of operation achievable for the current fuel and operating conditions, an initial setting of engine operating parameters may be determined. This may include, for example, an initial setting for valve timing (such as a variable valve timing), valve overlap, an initial amount of LIVC, an initial amount of EGR, an initial amount of internal EGR, and a boost amount. A map, such as Maps 300a and 300b as illustrated in FIG. 3, may be used to determine the initial schedule of EGR and LIVC phasing for the engine.

At 410, based on the octane rating of the fuel delivered to the engine, an EGR and/or LIVC schedule may be adjusted. In one example, when operating with a fuel of lower octane rating such as gasoline, a lower peak achievable torque and a narrower operating torque range may be determined. Subsequently, the EGR amount may be scheduled such that the EGR threshold is gradually phased in at a lower mid torque (in one example, $MT_1$ of Map 300a in FIG. 3) and then gradually phased out as the peak torque is reached. In another example, when operating with a fuel of higher octane rating such as E85, a higher peak achievable torque and a broader operating torque range may be determined. Subsequently, the EGR amount may be scheduled such that the EGR threshold is gradually phased in at the higher mid torque (in one example, $MT_3$ of Map 300a in FIG. 3) and then gradually blended out as the higher peak torque is reached. Thus, the EGR operation may be extended to higher engine torques when operating with a fuel of higher octane rating. Likewise, at lower or mid torques, the EGR schedule may be maintained independent of the fuel blend and/or peak torque/torque range.

In another example, the EGR amount may be an internal EGR amount that may be adjusted by adjusting valve timing. For example, when operating with a fuel of higher octane rating, a higher amount of internal EGR may be desired in the operating torque range. In one example, the higher amount of internal EGR may be achieved by increasing the lift of an exhaust valve, delaying the closure of an exhaust valve, advancing the opening of an intake valve, or combinations thereof. Consequently, a larger portion of heated exhaust gas may be retained in the cylinder, for use during the next firing event. As such, the timing of the variable valve actuator may be adjusted to phase, as much as possible, in the internal EGR as the torque threshold is reached and phasing out, as much as possible, the internal EGR as the peak achievable torque is reached. Further, the phasing out of the internal EGR may begin at a higher torque as the peak torque increases.

An analogous approach may be taken towards LIVC control responsive to fuel composition. In one example, when operating with a fuel of lower octane rating such as gasoline, an LIVC amount may be gradually phased out as a lower peak torque is reached (in one example, $PT_1$ of Map 300b in FIG. 3). In another example, when operating with a fuel of higher octane rating such as E85, the LIVC operation may be extended over a wider torque range and gradually phased out as a higher peak torque is reached (in one example, $PT_1$ of Map 300b in FIG. 3).

In this way, by blending EGR and/or LIVC amounts as a peak torque is reached, the maximal benefits of EGR and LIVC may be achieved over the duration of engine operation. By adjusting the EGR and/or LIVC amounts to phase out when peak torque is requested, engine drivability may be improved. Further, by adjusting the EGR and/or LIVC schedule responsive to dynamic changes in engine fuel composition, EGR and/or LIVC can be advantageously used over a broad range of engine torques to thereby achieve maximum engine performance and minimum emissions.

The invention claimed is:

1. A method for an engine, comprising:
operating the engine with a variable cylinder fuel blend that varies a peak achievable engine torque for a given condition;
selectively adjusting a cylinder valve timing to adjust an internal EGR amount at the given operating condition; and
extending the valve timing adjustment to higher engine torques as the peak engine torque for the given operating condition increases, the internal EGR amount increasing as the peak torque increases.

2. The method of claim 1 wherein the peak achievable torque increases as an alcohol content of the fuel blend increases.

3. The method of claim 2 wherein operating the engine with a variable fuel blend includes injecting the variable fuel blend via a direct injector.

4. The method of claim 3 further comprising operating the engine with boost, the boosting limit increased as an alcohol amount of the variable fuel blend increases.

5. The method of claim 4 wherein the variable fuel blend includes fuel with a variable amount of ethanol.

6. The method of claim 2 wherein operating the engine with a variable cylinder fuel blend includes using two injectors and varying a relative amount of injection from each injector to the cylinder.

7. The method of claim 1 wherein the given operating condition is engine speed.

8. The method of claim 1 wherein extending the valve timing adjustment includes phasing out the valve timing adjustment as the peak engine torque approaches when peak engine torque is requested.

9. A method of operating an engine in a vehicle, the method comprising:
- operating the engine with a variable fuel blend in a cylinder, where the variable fuel blend varies a peak achievable engine torque for a given operating condition to thereby provide a variable sized available engine torque range;
- selectively operating an engine actuator that affects engine torque and engine fuel economy at the given operating condition; and
- phasing the engine actuator in and out of operation differently over the variable peak achievable torque range responsive to a current fuel blend, wherein phasing the actuator in and out of operation includes adjusting a timing of a variable valve actuator to phase in internal EGR as a torque threshold is reached and phasing out internal EGR as the peak achievable torque is reached, and where the phasing out internal EGR begins at a higher torque as the peak torque increases.

10. The method of claim 9 wherein the fuel blend varies after a fuel refilling event where a fuel of a different alcohol blend than in a fuel tank of the engine is provided.

11. A method of operating an engine in a vehicle, the method comprising:
- operating the engine with a variable fuel blend in a cylinder including injecting the variable fuel blend via a direct injector, where the variable fuel blend varies a peak achievable engine torque for a given operating condition to thereby provide a variable sized available engine torque range;
- selectively operating an engine actuator that affects engine torque and engine fuel economy at the given operating condition, the actuator including variable cylinder valve timing that adjusts internal EGR; and
- phasing the engine actuator in and out of operation differently over the variable peak achievable torque range responsive to a current fuel blend, where engine actuator operation at mid torque levels is maintained independent from changes in the fuel blend.

12. The method of claim 11 wherein the variable sized available engine torque range increases with increasing alcohol in the blend.

13. The method of claim 12 further comprising operating the engine with boost, the boosting limit increased as an alcohol amount of the variable fuel blend increases.

14. The method of claim 13 wherein the variable fuel blend includes fuel with a variable amount of ethanol.

* * * * *